United States Patent [19]

Dawson et al.

[11] 4,397,997

[45] Aug. 9, 1983

[54] ULTRATURBULENT COUPLING OF POLYMERIC DIAZONIUM SALTS

[75] Inventors: Daniel J. Dawson, Los Altos; Phillip J. Brock, Sunnyvale, both of Calif.

[73] Assignee: Dynapol, Palo Alto, Calif.

[21] Appl. No.: 318,251

[22] Filed: Nov. 4, 1981

[51] Int. Cl.³ .................................................. C08F 8/00
[52] U.S. Cl. ...................................... 525/384; 525/376
[58] Field of Search ................ 260/144; 525/351, 376, 525/384

[56] References Cited

U.S. PATENT DOCUMENTS

| Re. 30,362 | 8/1980 | Gless | 525/355 |
| 3,920,855 | 11/1975 | Dawson | 426/250 |
| 4,018,826 | 4/1977 | Gless | 525/351 |

*Primary Examiner*—Paul R. Michl
*Attorney, Agent, or Firm*—Burns, Doane, Swecker & Mathis

[57] ABSTRACT

Polymeric diazonium salts are coupled to coupling agents without complications of precipitation by injecting a diazonium salt solution into a substantial volume excess of the coupling agent solution immediately adjacent to the impellor of a centrifugal pump or the like.

9 Claims, 2 Drawing Figures

ULTRATURBULENT COUPLING OF POLYMERIC DIAZONIUM SALTS

BACKGROUND OF THE INVENTION

1. Field of the Invention

This invention relates to an improved process for synthesizing water-soluble azo compounds on a large scale. More particularly, it relates to an improved azo coupling step in a process for synthesizing soluble polymeric azo compounds. In a preferred embodiment it applies this improvement to the synthesis of polymeric pharmaceuticals.

2. Discussion of the Prior Art and Statement of the Problem to be Solved

The following U.S. patents are commonly assigned herewith and are believed to be representative of references that relate to the synthesis of polymeric azo-linked compounds—U.S. Pat. Nos. 3,920,855 of Dawson et al.; RE30,362 of Gless et al.; and 4,190,176 of Parkinson et al. The first and second references disclose the preparation of polymeric azo dyes while the third reference discloses the preparation of azo-linked polymeric pharmaceutical agents.

The usual procedure for synthesizing an azo group-containing compound is to add a solution of a diazonium salt to an alkaline solution of a coupling agent; for example,

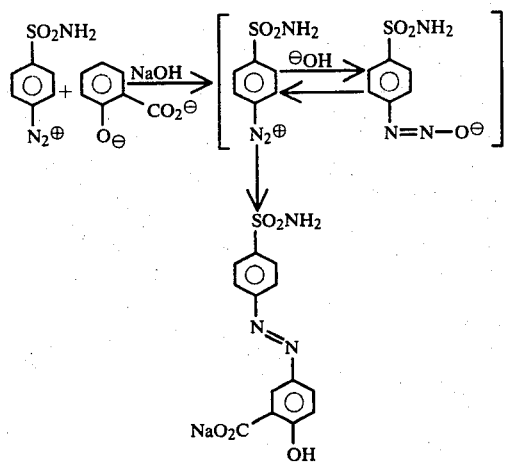

Particularly at high pH conditions (pH≧12), some of the diazonium groups (cationic) are converted to diazotate groups (anionic). In monomeric reactions, this causes no real problems other than a slightly reduced yield due to the slow reversion of trans-diazotate to the diazonium salt which is needed for the coupling reaction.

When this reaction is conducted with a polymeric diazonium salt, major crosslinking can occur to form a gel; the cause appears to be as follows:

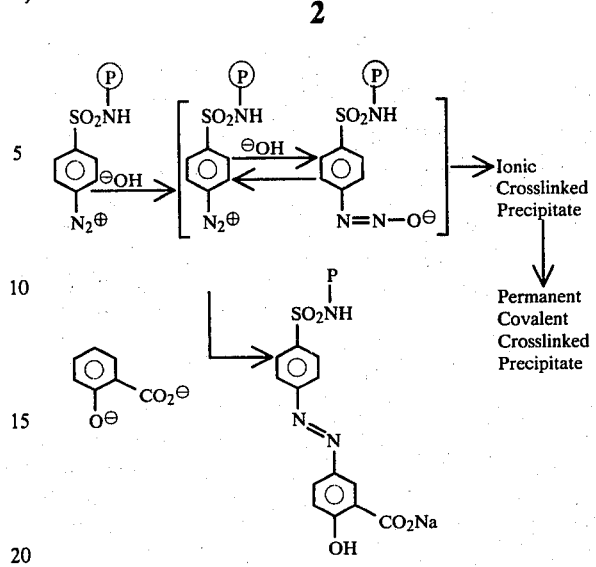

If a highly reactive coupling agent, such as a β-naphthol or a pyrazolone, is used the polymeric diazonium salt reacts so quickly with this agent that the conversion from cationic to anionic polymer is quite rapid and usually without observable precipitate formation. However, when a less-reactive coupling agent, such as salicylic acid, is used the polymeric diazonium salt does not react quickly with it. Instead, the cationic diazonium group is slowly converted to the anionic diazotate group. It appears that when the polymer reaches a certain critical ratio of cationic to anionic groups, it precipitates due to this electrostatic attraction (ionic crosslinking). Once the polymer, still bearing many highly reactive diazonium groups, has entered a condensed phase, permanent covalent crosslinks can and do readily form. This problem becomes more acute the higher the molecular weight of the polymer.

Since the reaction rate of the coupling agent cannot be readily increased and the molecular weight of the polymer may be fixed by desired product specifications, the only solutions to this problem are (1) to increase the amount of coupling agent available to the polymeric diazonium salt, and (2) to speed up the conversion of diazonium groups to diazotate groups.

The coupling procedure disclosed in the above-noted representative patents involves dropwise addition of the diazonium salt solution to a well-stirred coupling solution. Even on a small scale, the immediate region of the impacting drop rapidly becomes depleted in both coupling agent and hydroxide ions. At all but a milliliter scale, no amount of conventional magnetic or overhead agitation is adequate to prevent gel formation with less reactive coupling agents.

STATEMENT OF THE INVENTION

A process has now been found that permits slow reacting coupling agents to be coupled to polymeric diazonium salts in large scale without gel formation. This process involves circulating, via a centrifugal pump, a stream of the coupling agent alkaline solution, and injecting into that first stream a second stream of the polymeric diazonium ion solution under conditions that assure (1) that the rate of flow of the first stream is at least 45 times that of the second, (2) that the total equivalents of diazonium salt is controlled to provide a ratio of coupling agent:polymer of at least 1:1, (3) that the polymer solution has a concentration of less than 15% by weight and (4) that the point of injection of the polymer stream into the coupling agent stream is as close as possible to the impellor of the centrifugal pump.

BRIEF DESCRIPTION OF THE DRAWINGS

This invention will be described with reference to the attached drawing wherein.

DETAILED DESCRIPTION OF THE INVENTION

The zone employed for reacting the coupling agent and the polymer must provide ultravigorous (ultraturbulent) mixing of the two solutions and present no opportunity for formation of pockets for high diazonium compound concentration. This can be achieved by circulating the coupling solution with a centrifugal pump and slowly feeding the polymeric diazonium solution into the pump inlet just in front of the impellor. As long as the pump size and flow are properly matched to the polymer feed rate, the mixing is virtually complete and instantaneous and no polymer precipitation is seen. The polymer feed line should also be designed so that (1) The polymer solution is injected into the flowing coupling solution stream and not along the wall, and, (2) There is no possibility of the coupling solution backing up into the polymer feed line; this would cause immediate preipitation and clogging.

Figure 1:
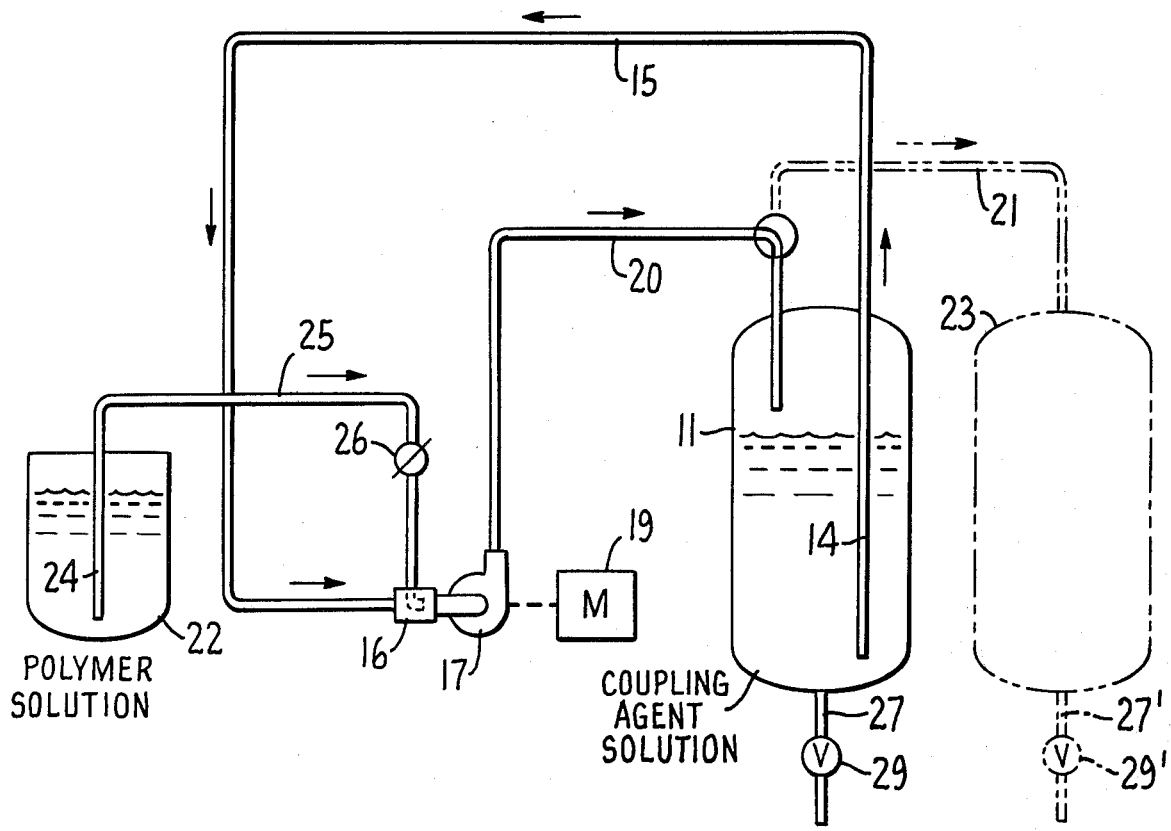
FIG. 1 is a schematic flow diagram of the process of this invention.

Such a reaction system is shown in FIG. 1 wherein a coupling agent solution is contained within vessel 11. This solution is withdrawn through dip tube 14, passed through line 15 to T 16 immediately adjacent to the inlet to centrifugal pump 17, which is driven by motor 19. The discharge of pump 17 passes the solution through line 20 back to vessel 11 in a continuous loop. Polymeric diazonium compound solution of 1 to 15% by weight concentration is contained within vessel 22. It passes through dip tube 24 and line 25 to flow regulator 26. Flow regulator 26 passes a metered amount of the polymer solution to T 16 where it is admixed with the coupling solution in pump 17. The relative flow rates of polymer solution: coupling solution are between 1:45 to 1:300. The combined solutions are passed through line 20 either to vessel 11, (and so circulated until the correct stoichiometric amount of polymer has been added) or optionally the combined solutions are passed through line 21 to holding tank 23. In either case, the reacted product is withdrawn via line 27 and valve 29 or line 27' and valve 29'.

Figure 2:
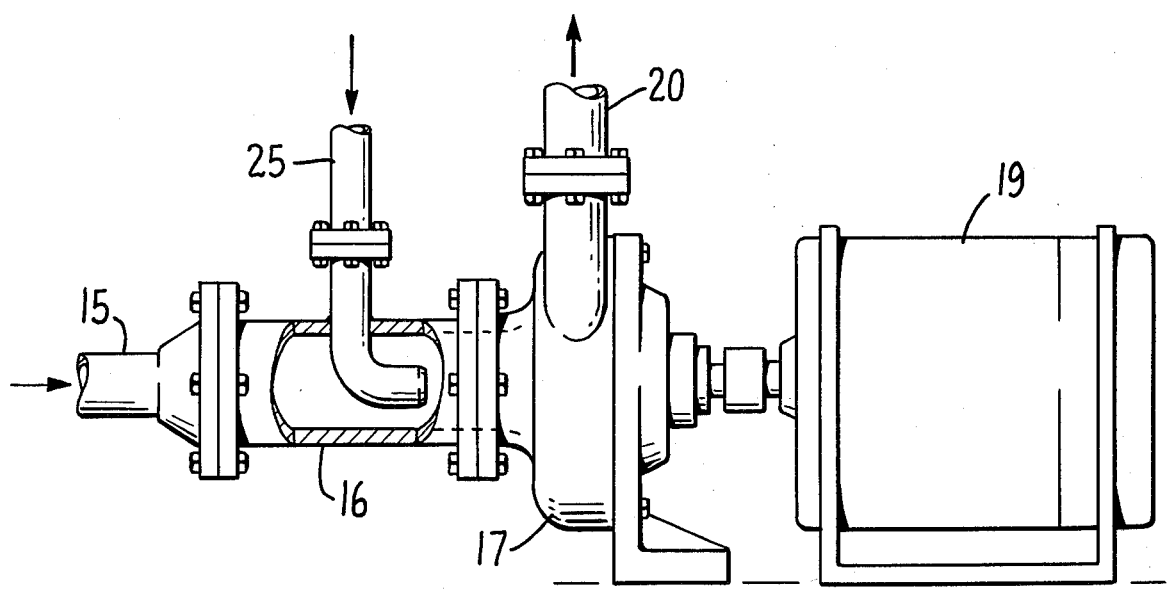
FIG. 2 is a cut-away side view of the centrifugal pump reactor preferred for employment in this invention.

Turning to FIG. 2, an expanded view of the mixing means employed in the invention is shown to include centrifugal pump 17, driven by motor 19. The inlet to pump 17 is connected to mixing T 16 which is in turn connected to coupling solution line 15 and polymer feed line 25. Line 25's connection into T 16 is such that the polymer feed goes directly into the body of pump 17 without touching the walls of T 16 and also such that the movement of the coupling solution stream tends to scavenge the polymer solution and pull it from its feed line 25, rather than to force it back up line 25.

THE PROCESS CONDITIONS

The process of this invention is characterized by maintaining certain conditions in the coupling zone.

The flow rate ratio of circulating coupling solution to polymer solution is not less than 45:1 and more suitably ranges from about 45:1 to about 300:1. Even higher ratios would be excellent for preventing gel formation but would have the disadvantage of being very dilute and requiring very large scale reaction equipment. Preferred flow rate ratios are from 60:1 to 250:1. Another parameter to be controlled is the molar ratio of coupling agent initially present to total polymeric diazonium salt fed. Suitably the ratio of coupling agent to polymer is at least 1.0:1, more suitably at least 1.3:1, preferably from 1.4:1 to 8:1 and more preferably 1.5:1 to 6:1. Again, one could use large excesses of coupling agent, say 10 or 20:1 but this would increase the reaction volume and would not be preferred, as a rule.

The polymer feed is acidic while the coupling agent feed is basic. The total volumes of these two streams and their respective acid and base contents should be such as to yield a basic final pH, especially at least about pH 11, and preferably at least about pH 12 and more preferably at or above about pH 12.5.

The reaction zone is depicted as a centrifugal pump. This is preferred. It would, however, certainly be within the scope of this invention to employ an additional pump to drive the coupling solution in the liquid circuit and use the impellor of a centrifugal mixer or other high-turbulence high-flow mixer or pump as the point of polymer injection. It is intended that the references to a centrifugal pump should encompass this embodiment as well.

The coupling reaction is carried out at low to moderate temperatures such as from about 0° C. to about 75° C., preferably at temperatures of from about 5° C. to about 60° C.

THE FEEDSTOCKS

This process has two feedstocks—an acidic polymer feedstock and an alkaline coupling agent feedstock.

THE POLYMER FEEDSTOCK

The polymer feedstock comprises a polymeric diazonium salt, acid and an aqueous solvent. The polymeric diazonium salt of necessity contains aromatic groups and can have either of two fundamental structures. In one, the aromatic groups are present as groups pendant from an organic chain which links them together into the desired polymer backbone. In the other, the aromatic groups are present within the organic chain itself. Mixtures of the two structures are possible, as well. The chains may be linear or branched.

These two structures can be represented by the generic formula:

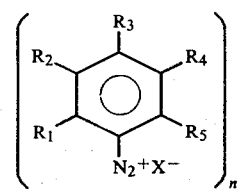

wherein n is an integer greater than 1; $X^-$ is an anion, such as a halide—e.g. $Cl^-$; at least one but not more than two of the R's are covalent links bonding the n aromatic rings into a polymeric unit molecule; and the remaining R's are independently selected from hydrogens or usual organic substituents, such as hydroxyls, amides, sulfonates, carboxylates, lower alkyls, esters, ethers or the like. In addition, two of $R_1$ through $R_5$ can be joined to form an aromatic ring fused to the illustrated ring. This fused aromatic ring can be the point of bonding into the polymer, if desired. Such diazonium group bearing aromatic rings or their alkyl or fused aromatic substituents can be substituted with alkyls, hydroxyls, carboxyls, sulfonates, and the like as well. Preferably, the aromatic group with its optional substituents contains from 6 to 14 carbons inclusive and not more than two fused aromatic rings and up to three substituents (in addition to its mandatory amine and linking groups) selected from alkyls, sulfonates, hydroxyls, and carboxyls. Other noninterfering units can be copolymerized into the polymer backbone as well. This is encompassed by the term "recurring" which when used to define a polymer leaves open the possibility of inclusion of other units.

The pendant structure which is more common and generally preferred may be represented structurally as a polymer having n recurring units of the formula

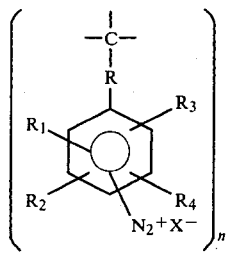

wherein C is a portion of an organic chain linking the units together; n is an integer greater than 1, preferably from 5 to 40,000, and more preferably from 10 to 10,000 and $X^-$ is an anion, preferably a halide—$Cl^-$, $I^-$, $Br^-$ or $F^-$ and more preferably $Cl^-$; R is a linking group, such term being defined to include a carbon-carbon single bond, an amine group, a sulfonamide group, an ether link, an ester link, an amide link, a carbamate link, an alkyl or, together with one of $R_1$-$R_4$, a fused aryl which itself depends from the backbone by one of the aforementioned links. $R_1$-$R_4$ are as already described.

When the aromatic groups are in the chain itself, the following structure is present

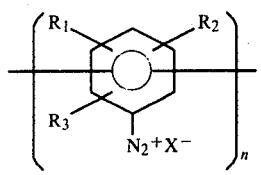

wherein $R_1$, $R_2$ and $R_3$ as well as n and $X^-$ are as previously set out.

A number of exemplary diazonium salt-containing polymers are given in a Table I. A further discription of these polymers is provided in U.S. patent application Ser. No. 300,621, filed Sept. 9, 1981, now U.S. Pat. No. 4,393,175, which is incorporated by reference. These are merely representative and are not to be construed as limiting the scope of diazotized polymers usefully coupled in the practice of this invention. Accordingly, other art-known backbones which would provide the desired diazonium groups could be employed as well as the materials herein specifically embodied.

TABLE I

Polymeric Diazonium Salts

| Embodiment Number | Generic Backbone Type or Precursor |
|---|---|
| 1 | Polystyrene or poly(p-aminostyrene) 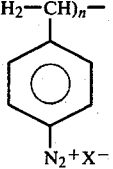 |
| 2 | Polyvinylamine-based-polysulfanilamide 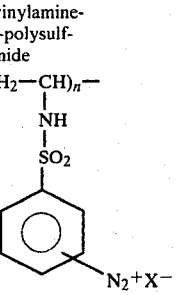 |
| 3 | Copoly(vinylamine-acrylic acid) based sulfanilamide 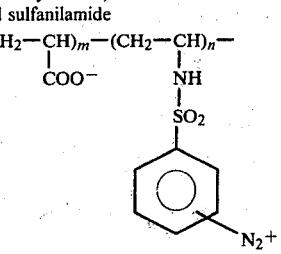 |
| 4 | Copoly(vinylamine-vinylsulfonate) based sulfanilamide) 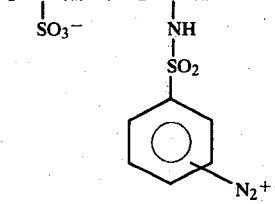 |

TABLE I-continued

Polymeric Diazonium Salts

| Embodiment Number | Generic Backbone Type or Precursor |
|---|---|
| 5 | Poly(ethylenimine-based polysulfanilamide) (a. branched or b. linear) <br> a. 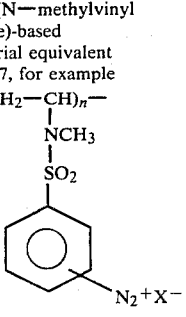 <br><br> b. 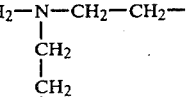 |
| 6 | Poly(vinylamine), its copolymers or poly(ethylenimine) following reaction with 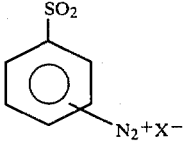 |
| 7 | Poly(vinylamine), its copolymers or poly(ethylenimine) following reaction with  |
| 8 | Poly(N—methylvinyl amine)-based material equivalent to 2-7, for example 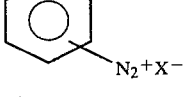 |
| 9 | Poly(vinylalcohol)-based equivalents of 2-5, for example 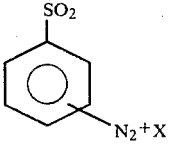 |
| 10 | Poly(acryloyl chloride)-based materials, for example 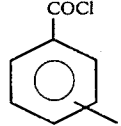 |
| 11 | Poly(epichlorohydrin)-based materials 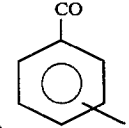 |
| 12 | Poly(ethylene terephthalate) based materials 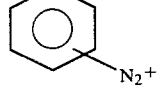 |

Backbones based on alkylamine-group-containing polymers, especially those shown in Embodiments 2 through 6 are preferred. These materials are available and art-known, or based on available art-known precursors.

The polymeric diazonium salt is presented as a 1 to 15% by weight, preferably 2 to 8% by weight and more preferably 3 to 6% by weight acidic aqueous solution. The acidity is supplied via strong preferably nonoxidizing mineral acid such as HCl, HBr or the like. The solution generally contains about 2 to 20 equivalents of acid, preferably 3 to 10 equivalents.

The solvent for this feedstock contains a substantial fraction of water. Pure water can be used. As a general rule of preference, the feedstock employed will be the diazotization reaction product without substantial modification or clean up. Such a product will often contain acetic acid and organic solvents such as lower alkanols, 2-alkoxyethanols especially 2-methoxy or ethoxyethanols or the like in amounts of up to about 50% by volume. Such materials are not required but their presence need not be excluded.

THE COUPLING AGENT

The coupling agent is an organic compound capable of reacting with a quaternary diazonium salt and forming an azo compound. Most commonly, these materials are aromatic compounds but alkyl compounds can be used as well.

The invention finds maximum advantage with "less reactive" coupling agents such as salicylic acid, 2-napthol-6,8-disulfonic acid, nitro phenols, nitro napthols or the like. A "less reactive coupling agent" is defined as one that requires a noticable period of time to react (e.g., seconds to hours) compared to a "reactive coupling agent" such as 2-naphthol or Pyrazolone-T which appear to couple almost instantaneously. A preferred coupling agent is salicylic acid. The coupling agent is employed as an alkaline aqueous solution. Alkalinity is usually imparted by an alkali metal hydroxyde most typically NaOH or KOH, although other strong bases, could be used as well. The solution pH is usually from about 10 to 13, preferably from 12 to 13. Additional base is often added during the reaction to maintain the desired pH's.

The solvent is aqueous, usually water. Obviously, noninterfering miscible cosolvents can be added, if desired.

UTILITY OF THE PRODUCTS

As noted in the Background of the Invention, the products of this invention have proven utility as pharmaceuticals and as dyes. The utility disclosures of the cited patents are incorporated by reference.

OTHER STEPS

As described herein, a substantial excess of base and coupler is present in the reaction environment. Following the reaction, these materials are usually removed from the desired products along with side products and the like such as by dialysis, ultrafiltration, or the like. The coupler and base so recovered can be recycled with or without intermediate purification.

The following examples are provided to illustrate the invention and are not to be construed as a limitation of its scope.

EXAMPLE I

A. Preparation of Polymeric Diazonium Salt Solution

Precursor Polymer Preparation

A stock of poly(vinylacetamide) was prepared by (1) condensing acetamide and acetaldehyde in the presence of acid to form ethylidene bisacetamide, (2) cracking the ethylidene bisacetamide to give vinyl acetamide and (3) polymerizing the vinyl acetamide. This preparation is described in detail in *J. Am. Chem. Soc.* 98, 5996 (Sept. 15, 1976) and for brevity is not here described in detail. The polymer product was purified by ultrafiltration to remove low molecular weight materials to yield a product having a median molecular weight by gel permeation comparison to polystyrene standards ($M_p^{ps}$) of $1.2 \times 10^5$. This polymer was hydrolyzed with hydrochloric acid as follows:

A 10–15 wt% solution of poly(vinylacetamide) in water containing 1.4 equivalents of hydrochloric acid was heated at reflux under argon for 20 hours to obtain a homogeneous aqueous poly(vinylamine hydrochloride) solution.

The crude product of this hydrolysis was an aqueous solution having the following general composition:

| | |
|---|---|
| Poly(vinylamine) hydrochloride | 1.4–2.2 meq/g |
| Acetic Acid | one mole per mole of poly(vinylamine) hydrochloride |
| Free Cl$^-$ | 0.56–0.88 meq/g |
| Water | remainder |

The crude product of the hydrolysis was used directly in a Schotten-Baumann coupling by adding base (NaOH) and 2-methoxyethanol to give a clear homogeneous pH 9–10 solution containing about 2% by weight poly(vinylamine) (as amine) and 62% by volume 2-methoxyethanol. (This process step is described in currently filed U.S. Ser. No. 300,619 filed Sept. 9, 1981 of Bunes. p-Acetamidobenzenesulfonyl chloride (1.2 equivalents, basis polymeric amine units) was then added in 3 equal portions with agitation while the pH was maintained in the range 9.5–10 by the addition of base. The agitation was continued at ambient conditions and pH was maintained at 9–11 by base addition for 2 hours after the last addition of the sulfonyl chloride to yield a homogeneous solution of

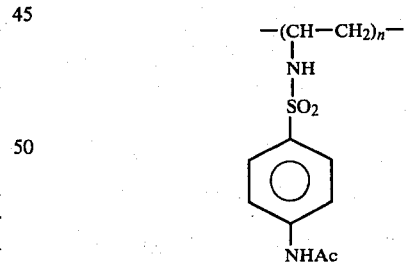

polymer.

This polymer solution was directly hydrolyzed without prior isolation of the polymer therefrom by adding 3.5 equivalents (basis acetamido units) of concentrated HCl and heating to 80° C. for 4 hours with agitation. This hydrolyzed the acetamido units to amines. The presence of the 2-methoxyethanol was responsible for being able to carry out the Schotten-Baumann coupling and subsequent hydrolysis as an unbroken sequence without isolation of intermediates or resorting to troublesome emulsions or suspensions.

A lot of 3.7 kg of

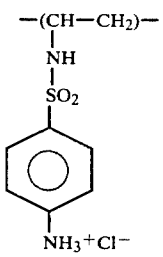

in 2-methoxyethanol/water as prepared above (total weight 50.76 kg) was stirred overnight with 2.657 kg of hydrochloric acid (21° Baume) and 2.31 kg of deionized water. This yielded 55.6 kg (50.6 liters) of solution.

The diazotization was carried out in a continuous high speed flow system employing a pair of ganged peristaltic pumps to feed the polymer solution and a sodium nitrite solution as disclosed in our concurrently filed U.S. Ser. No. 300,621, filed Sept. 9, 1981, now U.S. Pat. No. 4,393,175.

B. Set Up of Diazotization and Coupling Systems

A dual peristaltic pump system for diazotization was set up using a Masterflex TM motor drive and controller model number 7545 fitted with pump head number 7018 which was equipped with silicone tubing (0.4390" O.D., 0.3130" I.D.) for pumping polymer solution. Because of the flexible nature of this tubing, it was supported (outside the pump housing) by fitting it with a "sleeve" of more rigid, reinforced Tygon TM tubing. The motor drive was also fitted with Masterflex TM pump head number 7016 equipped with silicone tubing (0.2510" O.D., 0.1250" I.D.) for transfer of nitrite solution. The flow ratio for the two pumps was 4:1 by measuring the volumes of liquids pumped for a short time interval. At this flow ratio, the volume of nitrite solution required was determined to be 13.9 l [=50.55 l (vol. polymer soln.)×0.25 (flow ratio)×1.1 (safety factor)]. A solution of 1.738 kg of sodium nitrite (1.2 equivalents) was prepared and diluted to 13.9 l with deionized water.

A 1 l, four-necked, round-bottom flask was set up with an efficient overhead stirrer and a large diameter outlet tube leading to a 30 gallon polyethylene tank equipped with a thermowell. The exit tubes of the ganged pumps were positioned inside the flask through the other two necks. The flask was than charged with 500 ml of deionized water.

The coupling reaction system was then set up. A 100 gallon polyethylene tank was equipped with an air-driven overhead stirrer, a centrifugal pump (Flotec Model C6P8 with 3¼" or 4" impellor) 33-35 gpm output, a peristaltic pumping system for the addition of 50% sodium hydroxide solution (capacity greater than 4 l/hr), and a pH probe which had been calibrated in pH 12.0 buffer at 25° C. The centrifugal pump was fitted with a "T" fitting at the pump inlet to allow for the simultaneous intake of polymeric diazonium solution and circulating coupling reaction medium with mixing occurring in the impellor housing. The tank was then charged with 40 gallons of deionized water and 6.83 kg (49.49 moles; 2.38 equiv., basis total aromatic amine by actual assay) of salicylic acid. The air-driven stirrer was turned on to moderate speed and sufficient sodium hydroxide was added to dissolve the salicylic acid and raise the solution pH to 12.5. Ice was loaded into the tank until a temperature of 10°-13° C. was achieved.

At this point, both reaction systems were ready. The stirrer of the 1 l flask mixing chamber for the diazotization was turned on to moderate speed and 25 ml of the prepared sodium nitrite solution and 5 ml of 21° Baume hydrochloric acid were added. The pump exit tubes were adjusted to discharge their reactant streams below the surface of circulating liquid and the stirrer was then turned on full. The ganged peristaltic pumps' motor drive was turned on to maximum output to initiate the diazotization reaction. Aliquots were taken periodically during the course of the reaction from the mixing chamber outlet tube, and all were found to be visually clear and precipitate-free.

When all the polymer solution had been added (29.1 minutes required), the pump motor drive was immediately turned off. The solution remaining in the mixing chamber was added to the diazonium solution reservoir tank and this material was used immediately in the coupling reaction. (Some sodium nitrite solution remained but was discarded.)

C. Coupling

Introduction of the polymeric diazonium solution into the circulating coupling medium was initiated by removing a clamp from the inlet tubing which had been placed near the "T" fitting. Addition of the 17.5 gallons of diazonium solution required 113 minutes (average addition rate was 585 ml/minute). The reaction pH was maintained in the range 12.6-12.9 by the concurrent addition of 50% sodium hydroxide solution below the reaction medium surface while the reaction temperature was maintained in the range 10°-13° C. by the addition of ice as necessary. At the conclusion of the polymer addition, the cenrifugal pump was turned off but reaction mixing was continued via the overhead stirrer for an additional hour. At the end of this time, the agitator was turned off and the mixture was allowed to stand overnight while warming to 20° C.

The reaction mixture was transferred to a tared 100 gallon tank using approximately 10 l of rinse water. The total weight was 327.6 kg. A 300 ml sample was removed and, via centrifugation, was shown to contain no precipitated material. A 262.5 g portion of this material was readily passed through a glass fiber (GB/A) filtration disk and ultrafiltered with deionized water make-up for 20 diavolumes. The resultant solution was lyophilized to afford 3.64 g of orange solid 1, which extrapolated to a batch yield of 4.54 kg.

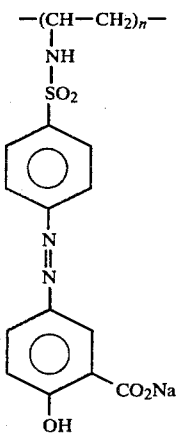

Utility of the Product

The product of this example is identical to the product shown in U.S. Pat. No. 4,190,716 which product is there shown to effectively release the desirable intestinal drug, 5-aminosalicylic acid, in the bowel.

EXAMPLE II

The coupling of Example I was repeated numerous times varying the following reaction parameters
Temperature: 10°–65° C. (at 65° C. somewhat lower yields are noted)
Polymer concentration: 2 and 4%
Flow ratio, coupler/polymer: 60:1 to 110:1
Mole ratio coupler/total diazonium 1.5:1 to 5.0.:1
pH: >14, 13.4, 13.0, 12.5, 12.0.

At these conditions the coupling occurred without gelation.

What is claimed is:

1. The process for coupling a slow-reacting coupling agent to a polymeric diazonium salt which comprises:
   a. circulating via a centrifugal pump a first stream of an alkaline aqueous solution containing a predetermined quantity of said coupling agent and
   b. injecting into said first stream immediate to the impellor of said centrifugal pump a second stream of an acidic aqueous solution containing from 1 to 15% by weight of said polymeric diazonium salt, the volume of flow of said first stream being not less than 45 times that of said second stream and the molar equivalents of coupling agent being at least 1.0 times the total molar equivalents of polymeric diazonium salt.

2. The process of claim 1 wherein the pH is maintained at 11 or above.

3. The process of claim 2 wherein said polymeric diazonium salt has recurring units of the structure

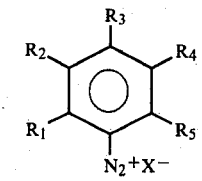

wherein $X^-$ is an anion, at least one but not more than two of the R's are covalent links bonding the aromatic rings into a polymeric unit molecule and the remaining R's are independently selected from among hydrogen, alkyls, hydroxyls, amines, sulfonates, carboxylates, lower alkyls, esters and ethers.

4. The process of claim 2 wherein the molar ratio of coupling agent to polymer is at least 1.3:1.

5. The process of claim 4 wherein the concentration of the polymer solution is 15% by weight or less.

6. The process of claim 5 wherein the pH is at least about 12.0.

7. The process of claim 6 wherein the polymeric diazonium salt is selected from among poly(p-aminostyrene), poly(vinylamine-based sulfanilamide) and poly(ethylenimine-based sulfanilamide).

8. The process of claim 1 wherein the coupling agent is salicylic acid.

9. The process of claim 7 wherein the coupling agent is salicylic acid.

* * * * *